July 16, 1940.                E. J. WINKLEMAN                2,207,844
                               VIBRATORY SCREEN
                              Filed Aug. 10, 1937            5 Sheets-Sheet 4
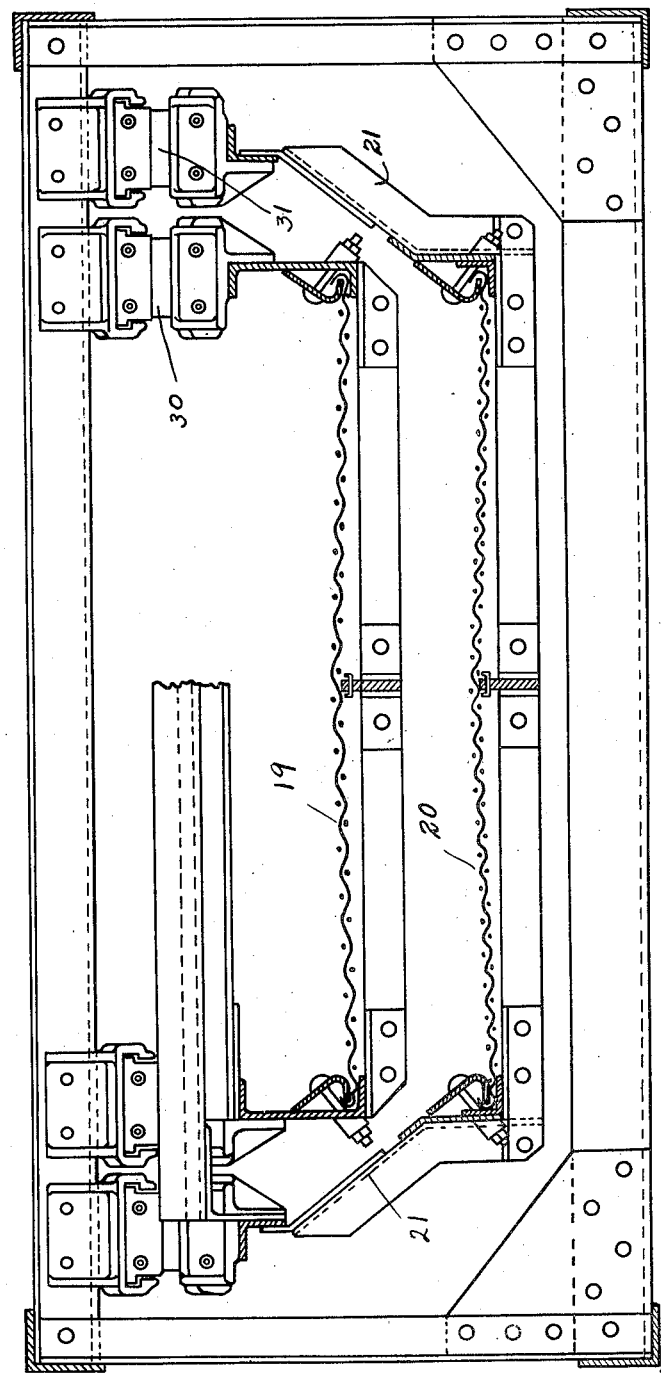
Fig. VI.
INVENTOR.
Edward J. Winkleman
BY Christy and Wharton
ATTORNEYS.

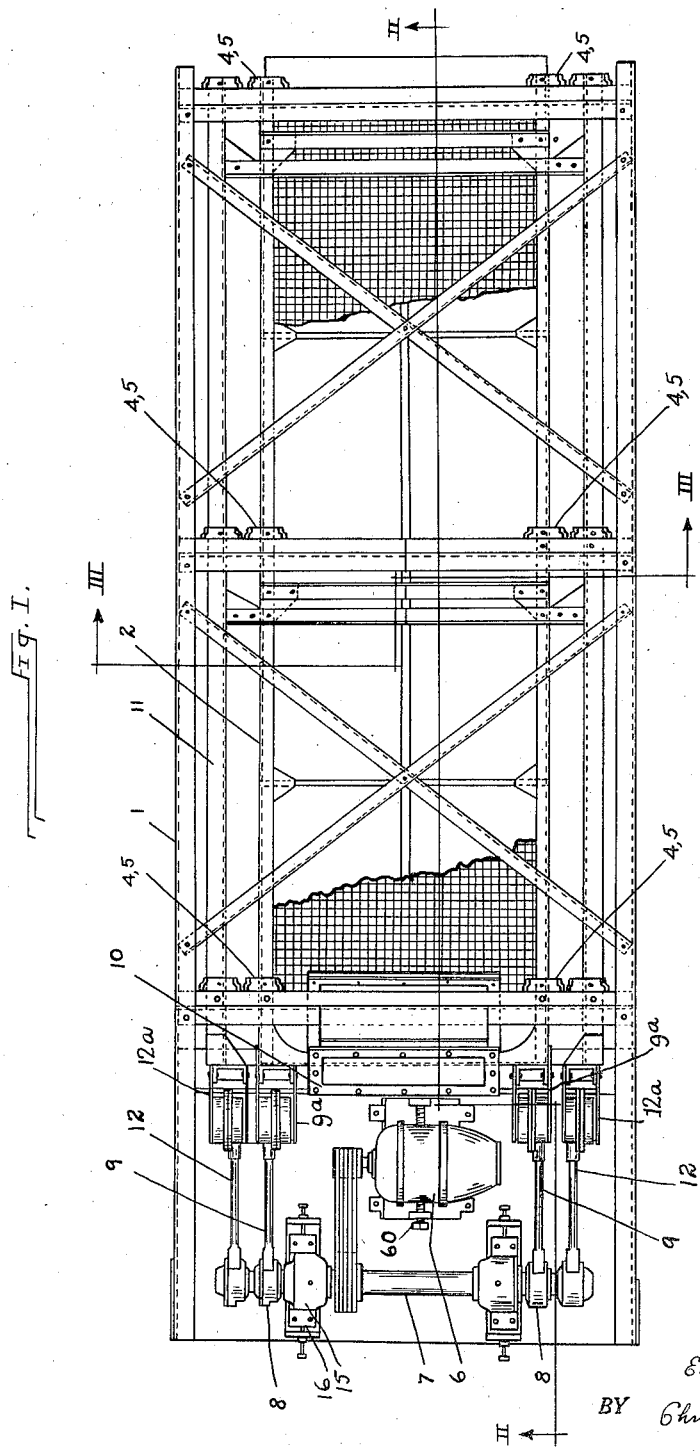

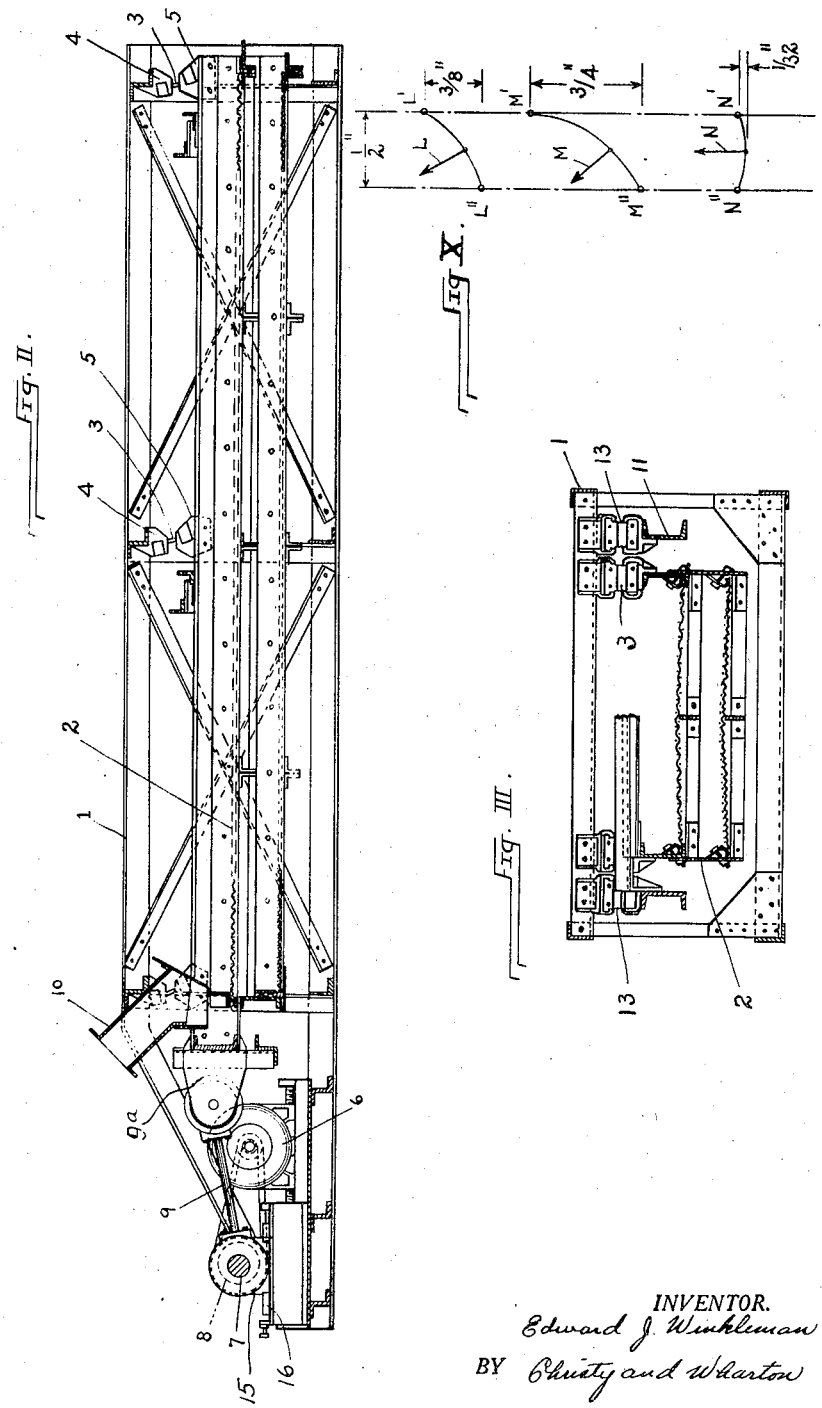

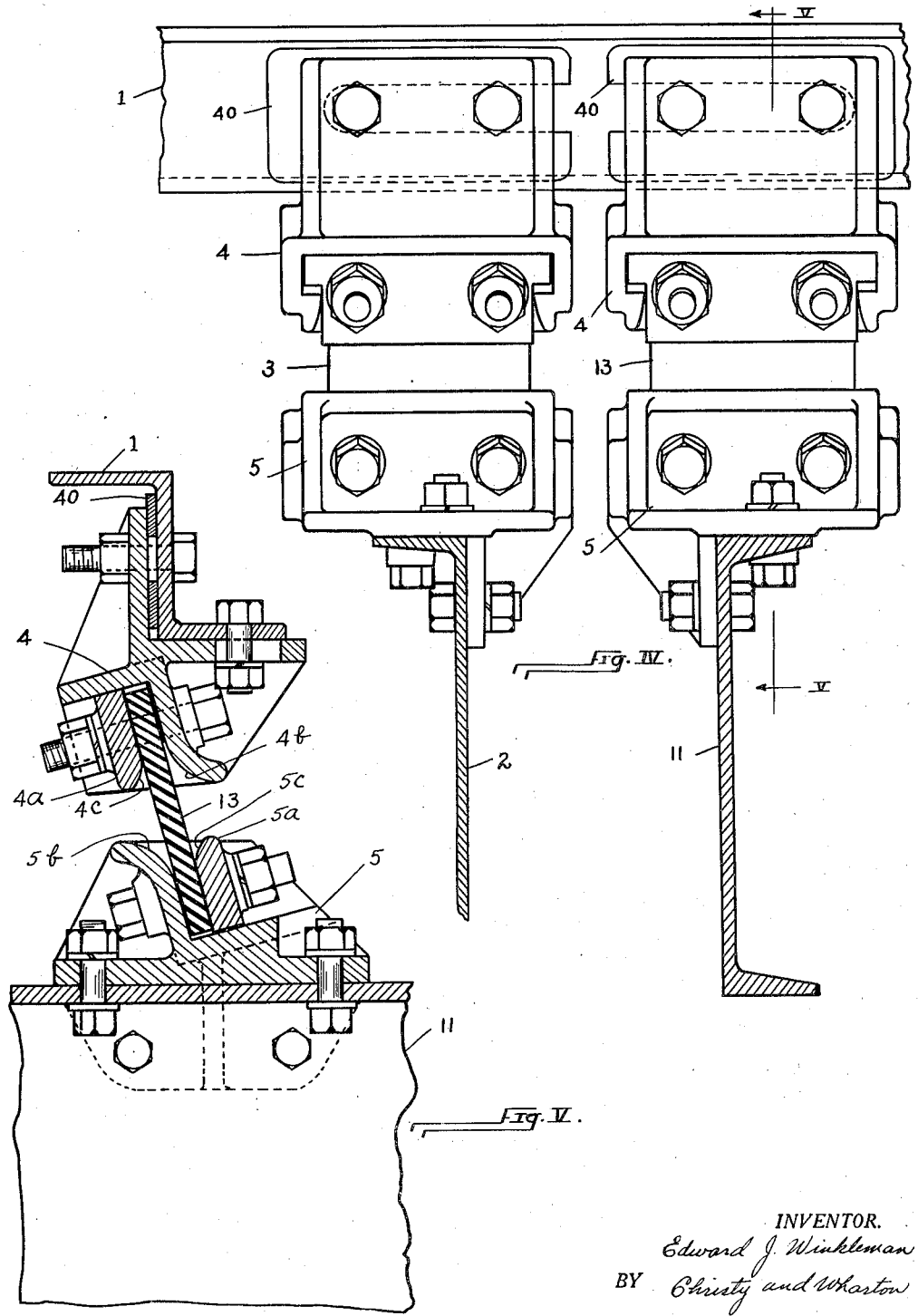

July 16, 1940.  E. J. WINKLEMAN  2,207,844
VIBRATORY SCREEN
Filed Aug. 10, 1937  5 Sheets-Sheet 5
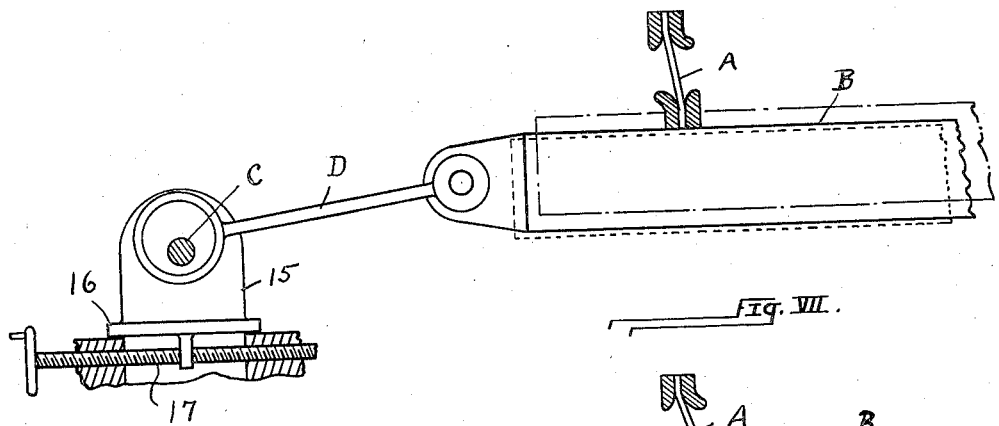
Fig. VII.
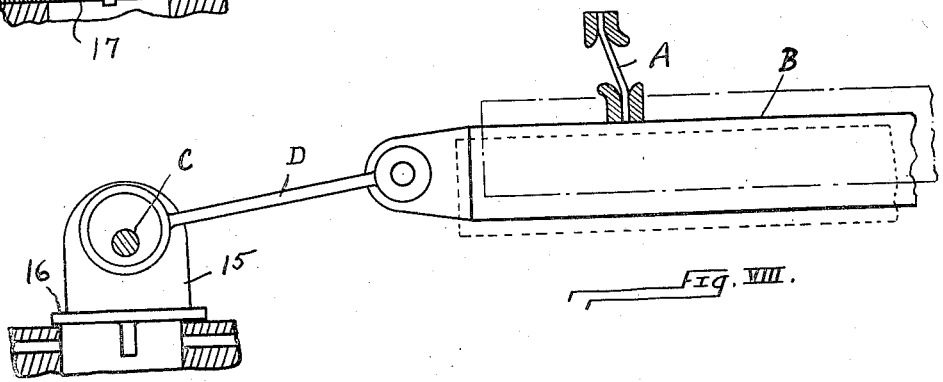
Fig. VIII.
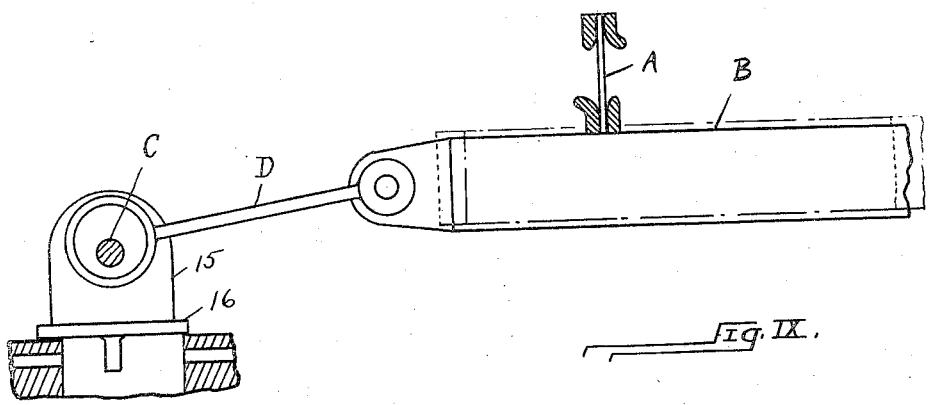
Fig. IX.
INVENTOR.
Edward J. Winkleman
BY Christy and Wharton
ATTORNEYS.

Patented July 16, 1940

2,207,844

UNITED STATES PATENT OFFICE 2,207,844

VIBRATORY SCREEN

Edward J. Winkleman, Oakmont, Pa., assignor of forty-nine per cent to Duquesne Slag Products Company, a corporation of Pennsylvania Application August 10, 1937, Serial No. 158,270

2 Claims. (Cl. 209—315)

This invention relates generally to apparatus comprising two or more reciprocated elements, and in its specific disclosure to apparatus for sizing particulate material. Primarily the invention resides in so mounting and relatively arranging reciprocatory bodies that they will follow in opposite sense and simultaneously irregular paths of movement in at least longitudinal counterbalance with each other, and that these paths may be variable by adjustment in the apparatus without detriment to the counterbalance of the reciprocatory bodies. Further, my invention resides in so mounting and driving the counterbalanced reciprocatory bodies that loading of one of the bodies, without a corresponding loading of the other, does not detract from the counterbalance of the bodies in their reciprocation, nor from the length and form of the paths traversed by the bodies in their reciprocation.

In my Letters Patent of the United States No. 2,079,059, I have disclosed reciprocatory mounting for "shape and density" classifiers, screens, conveyors, and the like, which mounting I employ in, and adapt to, the counterbalanced apparatus herein disclosed.

While the apparatus herein to be described is shown, and specifically described, as a screen, it is to be understood that, and the specification is to be read as contemplating, use of the principles involved in "shape and density" classifiers, conveyors, feeders, and other reciprocatory apparatus in which the counterbalanced opposed reciprocation of bodies in irregular paths is usefully effected.

Taking the application of the principles involved in a screen as exemplary:

In the accompanying drawings,

Fig. I is a plan view of screening apparatus in accordance with my invention, in which a screening element, reciprocatory as a unitary body, is balanced by a counterweight, a portion of the screening element being fragmentarily shown.

Fig. II is a longitudinal sectional view taken through the apparatus on the planes of the broken section line II—II of Fig. I.

Fig. III is a cross-sectional view taken on the planes of the broken section line III—III of Fig. I.

Fig. IV is a detail front elevational view, on an enlarged scale, showing the hangers of the apparatus, and attaching brackets therefor, and illustrating simple means for adjusting at one or more regions the "neutral" position of the hangers in suspending elements of the apparatus for reciprocatory movement.

Fig. V is a vertical sectional view, taken on the plane of the section line V—V of Fig. IV.

Fig. VI is a cross-sectional view, taken on the same plane as that on which Fig. III is taken, but on an enlarged scale, showing screening apparatus in accordance with the principles of my invention, but one in which two screen decks are arranged for reciprocation as separate elements in opposition to each other.

Fig. VII is a diagrammatic, detail, fragmentary view, showing driving means of the sort forming part of my apparatus, and showing one end of a body suspended for reciprocatory movement by a hanger of the sort incorporated in my apparatus; this view illustrating a positioning of the driving means of the apparatus to give one predetermined neutral position of the hanger.

Fig. VIII is a view similar to Fig. VII, but illustrating a position of the driving means to give a different neutral position of the hanger.

Fig. IX is a view similar to Figs. VII and VIII, but showing a yet different positioning of the driving means to give the hanger a neutral position different from either the neutral position shown in Fig. VII or the neutral position shown in Fig. VIII.

Fig. X is a diagrammatic view illustrating the paths followed by the reciprocatory bodies of the apparatus in three different adjustments of the hangers for the said reciprocatory bodies.

Referring initially to Figs. I to V inclusive of the drawings, reference numeral 1 designates a stationary frame for the reciprocatory elements of the apparatus, and reference numeral 2 designates a double-deck screening element reciprocatory in the said frame. The screening element 2 is suspended adjacent both its ends, and in an intermediate region by sets, or pairs of transversely aligned flexible hangers 3, engaged at their upper and lower ends respectively by clamping members 4, 4a and 5, 5a. In order that the flexion of the hangers 3 may be controlled in reciprocation of the screening element, to determine the path of movement of such suspended element in its reciprocation, the clamping elements 4 and 5 present to opposed faces of the flexible hangers 3 contact surfaces 4b and 5b curving away from the hanger faces. Similarly the clamping members 4a and 5a present to the opposed hanger faces contact surfaces 4c and 5c, curving away from the hanger faces opposed by them.

In reciprocation of the screening element 2, forward (i. e., to the right in Figs. I and V), the hangers 3 are flexed about the contact surfaces 4b and 5b, thus causing the suspended screening element 2 abruptly to depart from an arcuate path in its movement. In the rearward movement, (i. e., movement to the left in Figs. I and V), the screening element follows a reversal of the same path. In the final stages of rearward movement of the screening element, and the beginning of a complete forward movement, the contact surfaces 4c and 5c, by imposing flexion on the hangers, cause departure from the arcuate in the path of movement followed by the screening element.

The foregoing action gives an abrupt vertical component, or "kick" in the path of movement of the screening element. It should be explained that this "kick" in the path of movement of the screen is, under direct propulsion of the screen in a primarily arcuate path, susceptible of increase, or decrease in accordance with the neutral position through which each hanger passes in each complete forward or rearward movement of the reciprocatory screening element. Thus in Fig. V of the drawings, the neutral position of the flexible hanger 3 is such that the path of movement of a body suspended thereby will include a relatively severe vertical "kick." It is also possible so to determine the neutral positions of the several transversely aligned pairs of hangers that the pairs of hangers in different positions longitudinally of the screening element tend to impart a different "kick" effect to the screening element. This causes the reciprocatory element as a whole to describe a slurred, rather than a clean line, path.

In various operations, in which apparatus made in accordance with my invention may be used, it is of substantial advantage to produce a different movement, involving difference in the vertical component of movement, or kick, in different regions longitudinally of the screen. In screening, for example, such diversity in movement permits particles to be tossed relatively high from screening surface in one region, in order that full opportunity to pass through the screen be given the finer particles of a deep bed, while causing a relatively greater longitudinal propulsion of material in another region of the screen, to prevent an undue piling of material in that region and to facilitate scattering of particles over the screening surface. If there is in screening a tendency for particles of particular shape to become wedged in the screen openings, this may be prevented by intensifying the "kick" of the screen body either as a whole or regionally. In "shape and density" classifiers, feeders, conveyors, and the like, such diversity in movement along the surface of a reciprocated working body also has utility.

In order that apparatus of the general sort contemplated maintain its efficiency, and particularly in order that severe vibration in the apparatus be avoided, it is necessary that counterbalance be maintained during operation of the apparatus in such irregular manner, as well as in a less specialized operation of the apparatus.

In accordance with my invention there is provided one simple means for equally regulating the "kick" of all the hangers of the apparatus, and other simple means for regulating the "kick" of the hangers in individual pairs. In both regulatory adjustments counterbalance is maintained.

The apparatus receives driving power from a motor 6, mounted on a base 6a adjacent the frame 1 of the apparatus. Motor 6 drives an eccentric shaft 7, which carries a pair of eccentrics 8 cooperatively coupled with a pair of pitmans 9. The pitmans 9 connect with brackets 9a, shown in Figs. I and II adjacent a chute 10 for delivering particulate material to the screening element 2. These brackets 9a are disposed adjacent opposite sides of the screening element 2 at its rearward end, and the eccentrics and pitmans are, as shown, arranged uniformly to exert propulsive force at these brackets for reciprocating the screening element.

The counterweighting means of the apparatus consists of a pair of heavy channels 11, which extend longitudinally of the screening element on both sides thereof. The counterweight, formed by these channels 11, which together may desirably total approximately the weight of the screening element, is also directly driven from the eccentric shaft 7 which drives the screening element. Eccentrics, the bearings 12a for which are shown, are on the shaft 7 and lie transversely beyond the eccentric 8 forming part of the driving connection for the screening element. Pitmans 12, connecting with brackets 12a, lying transversely beyond the brackets 9, transmit driving power for reciprocating the channels forming the counterweight. It is to be understood that the eccentrics are arranged to impart to the screening elements propulsions so timed that movement of the counterweight is in direct opposition to movement of the screening element.

In order that the reciprocatory bodies, herein represented by the screening element 2 and the pair of channels 11, respectively, may follow identical paths of movement, the suspension of the counterweighting bodies is made identical with that of the screening element. Thus, the channels 11 are suspended from the frame 1 by means of flexible hangers 13, the hangers for the two channels being desirably in alignment with each other across the frame, and in transverse alignment with a pair of the hangers 3 which suspend the screening element.

The mounting for attaching each of the flexible hangers 13 to the frame and to the channels is, and the means for controlling flexion of the hangers 13, is as shown in Fig. IV identical with the mounting for the hangers 3. It is therefore to be assumed that, if equal and opposite propulsion be given the reciprocatory bodies, the paths of movement of the screening element and the counterweight will coincide in every successive impulsion imparted to the bodies. In this connection it should clearly be understood that the direct driving of these bodies from a common source (the eccentric shaft) and the fact that reciprocations of equal amplitude are predetermined for both, preserves counterbalance in spite of variation in the load carried by the screening element. To illustrate: if the total weight of the counterweighting beams be but moderately greater than the unloaded weight of the screening element, and an excessive load of particulate material be charged on the screening element, the paths of movement remain as before, and the timing of the reciprocation of both elements remains unchanged. The difference in weight between the two elements, caused by excessive loading, does not materially increase vibration.

It has been above noted that there is in my organization a neutral position for the flexible, strap-form hangers of the apparatus, and that this neutral position determines the path of movement followed by the suspended body. The reason for this effect will become clear upon an inspection of Figs. VII, VIII, IX and X of the drawings. Let us assume, as is a fact in my apparatus, that the length of stroke is invariable in spite of change in the neutral position of the suspension strap. Then in Fig. VII we see that, the hanger being inclined forwardly and downwardly to the suspended body, forward propulsion of the suspended body causes the hanger to be flexed more severely about the contact surfaces 4b and 5b than would be the case were the hanger so disposed as to extend perpendicularly to the suspended body. Fig VIII of the drawings shows a neutral hanger position in which the forward and downward inclination of the hanger is greater than in Fig. VII, the more severely to flex the hanger, by bringing it into flexing contact with the contact surfaces opposed to it during an increased proportion of the stroke. In Fig. IX the neutral position of the hanger is perpendicular to the suspended body, and the flexion of the hanger is in each stroke less severe than that effected when the neutral hanger position is as shown in Fig. VIII or as shown in Fig. VII. Since hanger flexion determines the "kick" in the path of movement of the suspended body, such "kick" may be predetermined in accordance with the neutral position of the hangers suspending the body.

Since the hanger shown in Figs. VII, VIII, and IX of the drawings may be either one of the flexible hangers 3 or one of the flexible hangers 13, these figures of the drawings being diagrammatic and functionally illustrative, the strap shown in these figures is designated by the reference letter A.

Since the reciprocatory bodies are freely suspended, the position of the body, designated in these illustrative figures of the drawings B is dependent upon the backing given the body by its associated eccentric, designated by reference letter C. The suspended body, and its hangers are in neutral position when the eccentric C is passing through its neutral position. In the organization the angle formed with the suspended body by a hanger in neutral position depends upon the position in which the body is held by its associated eccentric. This position may be adjusted, adjusting neutral hanger position and the path of movement of the suspended body, by shifting the mounting for the eccentric shaft toward and away from the rearward end of the fixed frame 1, from which the reciprocatory bodies are suspended. As shown, the eccentric shaft 7 is mounted in housings 15, the supports 16 for which are traversable toward and from the frame 1 by means of adjusting screws 17. Motor 6 may, by means of adjusting screw 60, be moved toward and from the frame 1 in accommodation to the adjusted position of the eccentric housings 15.

In Fig. VII the eccentric shaft is brought toward the frame to force the suspended body forwardly beyond a position in which the hangers stand perpendicular to the plane of the suspended body. In Fig. VIII a neutral position in which the hangers are inclined still further forward is caused by an increased forward adjustment of the eccentric shaft. In Fig. IX the eccentric shaft is retracted, giving a less advanced position of the suspended body and bringing the hangers into a neutral position generally perpendicular to the plane of the suspended body.

Clearly, adjustment in the manner above described applies equally to all pairs, or sets, of hangers throughout the length of the apparatus. Different means must be employed to give a different "kick" in different longitudinal regions of the suspended bodies. Assuming that the position of the eccentric shaft is such as to establish any one of the three neutral positions of Figs. VII, VIII, and IX in all the pairs of hangers by which the reciprocatory body is suspended, means must act locally on any transverse set of hangers to cause that set regionally to impart to the suspended bodies a localized "kick" tendency greater than that for which the driving means of the apparatus is adjusted.

In the drawings I show means of the simplest sort for effecting such adjustment. Those means are shims 40, which may be interposed between a dependent part of the clamping member 4 which engages the hanger. As shown, separate shims 40 are used for the adjustments of the clamping member for the hangers 3 which function to suspend the screening body and for the hangers 13 which suspend the counterbalancing body. These shims should be of approximately the same thickness. It may be desirable to use a single elongate shim for each association of straps at the same side of the apparatus.

The operative effect of the shims is to adjust the neutral position of any transversely aligned set of hangers, without changing the general neutral position of the other hangers of the apparatus. As is made clear in Fig. V of the drawings, the insertion of a shim in the position shown and described spaces the hanger-attaching bracket, or clamp rearwardly; thus increasing the inclination of the hanger in its neutral position, and tending to increase the vertical component, or "kick" in the path of movement of the suspended body.

The independent adjustment of one transverse set, or sets, of shims gives the suspended bodies a complex movement as they are reciprocated, and gives accommodation to the conveying, or sorting of particular materials of different characteristics, and to different speeds of operation and different conditions of delivery of the particulate material. When employing three or more transverse sets of hangers, the "kick" may be made progressively greater from either end of the apparatus to the other, by the insertion of shims of different thickness in different transverse sets of hangers.

The importance of having a transverse alignment of the hanger brackets resides in the fact that the same adjustment of the hangers will give a different effect in movement of the reciprocated body in accordance with the position of the hangers longitudinally of that body. Thus if the hangers supporting the screening body, for example, be staggered across the screening body, the two sides of the body will tend to follow paths of different form for the same adjustment of the hangers. While it is a comparatively simple matter equally to adjust the hangers on opposite sides of the screening body, it is a matter of great difficulty to make such different adjustment in the hangers across the apparatus as accurately to compensate for a difference in longitudinal position of those hangers. In lesser degree, it is also therefore a matter of general desirability that the counterweight hangers be in alignment across the apparatus with the hangers which support the screening element.

As the apparatus is organized, whatever be the action obtained by an independent selective adjustment of different transverse sets of straps, the adjustment is uniform throughout each complete set, and both the working body and the counterweighting bodies perform in counterbalanced opposition to each other identical movements. Also such complexity in the reciprocatory movement of the reciprocated bodies does not shorten the total stroke imparted to them, and does not lead to imperfect countermovement of the bodies when the working body of the assembly is heavily loaded.

Fig. X of the drawings illustrates the paths followed by the reciprocated bodies in their reciprocation, and the principle of counterbalance which is involved. In the uppermost hanger adjustment L of Fig. X, the flexion of the hanger gives a moderately intensified "kick" in forward movement of the reciprocated body. Assuming that the hanger adjustment for the two bodies is identical they follow coincident paths. Therefore as the screening body is moving forward to the position L', the counterweighting body is moving rearwardly to the position L''. It will be evident that in spite of the marked "kick," the bodies are in good approximate counterbalance both longitudinally and vertically.

In the hanger adjustment M the "kick" is further intensified, but it will be clear that the bodies, in opposite reciprocatory movement between the points M' and M'', remain in good approximate counterbalance with each other.

In the hanger adjustment N', the bodies are in good longitudinal counterbalance throughout their opposed movement between the points N' and N''. They are not in vertical counterbalance, since both are rising simultaneously at the end of both their forward and rearward movement. This fact is, however, of negligible importance, since the entire vertical movement is itself negligible. This sifting movement is one seldom used in screening, and is still less used in "shape and density" classification, conveying, or feeding.

Fig. VI of the drawings shows screening apparatus in which two separately suspended screening elements are mounted in counterbalance with each other. It will be observed that, although the screening elements 19 and 20 are vertically arranged one above the other, their hangers 30 and 31 are in horizontal alignment, the lower screening element 20 being carried by outlying rigid members 21, which are inclined to bring the screening element 20 into vertical alignment with the screening element 19.

These elements may also be driven by pitmans carried by the same eccentric shaft, similarly to the driving connections for the form of the apparatus shown in Figs. I to III inclusive of the drawings. While such leads to structural simplicity, various types of connection may be used to impart identical opposed movement to the balanced bodies. This structure, in which both counterbalancing bodies are working elements, is susceptible of the same general and special adjustments as is the structure shown in Figs. I to III inclusive of the drawings.

It is to be understood that numerous modifications may be made in the form and arrangement of the apparatus for reciprocating two, or more, suspended bodies regulably in counterbalance without departing from the spirit of my invention. Thus apparatus, constructed in general accordance with the showing of Figs. I to III inclusive of the drawings, may be made with a screening element comprising but one screening surface, which is counterbalanced by a body, or bodies, serving only as counterweight; in an arrangement such as that specifically shown in Fig. VI, the lower reciprocatory body may be merely a counterweight instead of providing an additional working surface; and two conveyor platforms, for example, may, if so desired, be mounted on opposite sides of, and counterbalanced by, an intermediate screening or classifying element, or a simple counterweight.

It will be observed that in the structures shown, both the general movement adjustment for the reciprocated bodies, and the localized movement adjustment for the reciprocated bodies, must be made while the apparatus is at rest. It is wholly possible to provide for making adjustment of the hangers, to vary the movement of the suspended bodies, while the apparatus is in operation. For example, I may provide for each set of hangers adjusting screws organized equally to move longitudinally of the apparatus the clamping element at one end of each of the hangers.

Many other constructional modifications may be made without departing from the spirit of my invention as defined in the appended claims. For example, without detracting from the effect of the driving means in establishing a neutral position for the hangers of both bodies, the effect of the driving means may be primarily a pulling rather than a pushing action on the suspended body.

I claim as my invention:

1. In apparatus for handling particulate materials the combination of a fixed frame with two bodies supported for reciprocation from said frame in vertical alignment with each other, means arranged invariantly to propel said bodies individually and simultaneously in opposition to each other through paths comprising horizontal components of equal fixed length, hangers providing the means for supporting the said bodies from the frame and comprising each a flexible element, the flexible elements of all the hangers for both bodies having their terminals attached to the frame in the same horizontal plane and the flexible elements of all the hangers for both bodies being of equal length and arranged to impart to the path of movement of the bodies in their individual propulsion equal and simultaneously incident vertical components of substantial length, so that as the bodies are propelled in opposition to each other the paths of movement of the two bodies directly oppose each other in identical oppositely directed paths and throughout each stroke imparted to the two bodies are in approximately perfect vertical and horizontal counterbalance.

2. In apparatus for handling particulate materials the combination of a fixed frame with two bodies supported from said frame to lie in coextensive position longitudinally of the frame, means arranged invariantly to propel said bodies individually and simultaneously in opposition to each other through paths comprising horizontal components of equal fixed length, hangers providing the means for supporting the said bodies from the frame and comprising each a flexible element, the flexible elements of all the hangers for both the said longitudinally co-extensive bodies having their terminals attached to the frame in the same horizontal plane and the hangers of each said body being aligned with those of the other said body in lines extended transversely of the frame, the flexible elements of all the hangers for both bodies being of equal length and arranged to impart to the path of movement of the bodies in their individual propulsion equal and simultaneously incident vertical components of equal fixed length, so that as the bodies are propelled in opposition to each other the paths of movement of the two bodies directly oppose each other in identical oppositely directed paths and throughout each stroke imparted to the two bodies are in approximately perfect vertical and horizontal counterbalance.

EDWARD J. WINKLEMAN.